US007606524B1

(12) United States Patent
Frank

(10) Patent No.: US 7,606,524 B1
(45) Date of Patent: Oct. 20, 2009

(54) INTEGRATED MONITORING AND COMMUNICATIONS RECEIVER ARCHITECTURE

(75) Inventor: Robert Joseph Frank, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 669 days.

(21) Appl. No.: 11/133,626

(22) Filed: May 20, 2005

(51) Int. Cl.
*H04Q 7/20* (2006.01)
*H04M 1/66* (2006.01)
*H04K 3/00* (2006.01)

(52) U.S. Cl. ......................... 455/1; 455/456.1; 455/410

(58) Field of Classification Search ............. 455/456.1, 455/404.1, 1, 114.1, 456.2, 404.2; 342/357; 380/252
See application file for complete search history.

(56) References Cited

U.S. PATENT DOCUMENTS 4,103,236 A * 7/1978 Deserno et al. ................ 455/1
6,330,452 B1 * 12/2001 Fattouche et al. ........ 455/456.1
6,366,765 B1 * 4/2002 Hongo et al. ............ 455/161.1
6,476,755 B1 * 11/2002 Senio et al. .................... 342/15
6,687,506 B1 * 2/2004 Girod ...................... 455/456.4
7,069,025 B2 * 6/2006 Goren et al. ............. 455/456.2
7,099,369 B2 * 8/2006 Karlsson ..................... 375/130
7,239,843 B2 * 7/2007 Jung ............................. 455/1
7,429,914 B2 * 9/2008 Carlson et al. ......... 340/286.01
2004/0102198 A1 * 5/2004 Diener et al. ............ 455/456.1
2005/0192026 A1 * 9/2005 Carlson et al. ........... 455/456.1

* cited by examiner

*Primary Examiner*—Tilahun Gesesse
(74) *Attorney, Agent, or Firm*—Daniel M. Barbieri

(57) ABSTRACT

The present invention is an integrated monitoring and communication receiver architecture. A staring receiver in accordance with the present invention may include a RF front end and a memory for storage of channel samples. The staring receiver may be capable of staring across an entire hopped communications bandwidth and storing a time-duration of channel samples within the memory to enhance acquisition and demodulation processing. The staring receiver may provide simultaneous visibility and reception of multiple signals with different time and frequency hopping patterns. Additionally, the staring receiver may be capable of spoofing whereby false cross correlations are presented to thwart geographically diverse intercept receivers.

14 Claims, 5 Drawing Sheets

INTEGRATED MONITORING AND COMMUNICATIONS RECEIVER ARCHITECTURE

FIELD OF THE INVENTION

This invention relates generally to wireless communication systems and more particularly to an integrated monitoring and communications receiver architecture.

BACKGROUND OF THE INVENTION

Wireless communication systems have been developed to provide communication links between multiple mobile parties. For example, military applications require wireless communication between ground troops and military vehicles and the like. Third parties, such as adversarial groups in military conflicts, attempt to intercept and recover wireless communications. Consequently, the prevention of signal detection has become critically important. High data throughput is also desirable as the requirements for data throughput continue to increase due to the complexity of applications available across wireless communication systems.

Current approaches to wireless systems employing signal detection prevention are accompanied by a performance shortfall in data rate and data link behavior. For example, channel capacity may be reduced in order to reduce the probability of detection. The complexity and steering inefficiencies of current directional approaches in conjunction with radiated power, time and bandwidth limitations of omni-directional systems deliver very limited functionality in many situations. With new network centric demands on operational units for further sharing, the need exists to more intelligently utilize radio frequency (RF) bandwidth and capitalize the RF channel environment. Consequently, an integrated monitoring and communication receiver architecture is necessary to facilitate high data throughput capacity with signal detection prevention.

SUMMARY OF THE INVENTION

Accordingly, the present invention is directed to an integrated monitoring and communication receiver architecture. In an embodiment of the invention, a staring receiver in accordance with the present invention may include a RF front end and a memory for storage of channel samples. The staring receiver may be capable of staring across an entire hopped communications bandwidth and storing a time-duration of channel samples within the memory to enhance acquisition and demodulation processing.

Advantageously, the staring receiver may provide simultaneous visibility and reception of multiple signals with different time and frequency hopping patterns. The staring receiver of the present invention may be capable of monitoring radiometric feedback to guide the receiver to specific frequencies for signal demodulation. This may allow for repeat jammer initiation of communication links on non-preplanned frequencies along with real time triangulation of environmental emitters. Additionally, the staring receiver may be capable of spoofing whereby false cross correlations are presented to thwart geographically diverse intercept receivers.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

Those numerous objects and advantages of the present invention may be better understood by those skilled in the art by reference to the accompanying figures in which.

DETAILED DESCRIPTION OF THE INVENTION

Reference will now be made in detail to presently preferred embodiments of the invention, examples of which are illustrated in the accompanying drawings.

Figure 1:
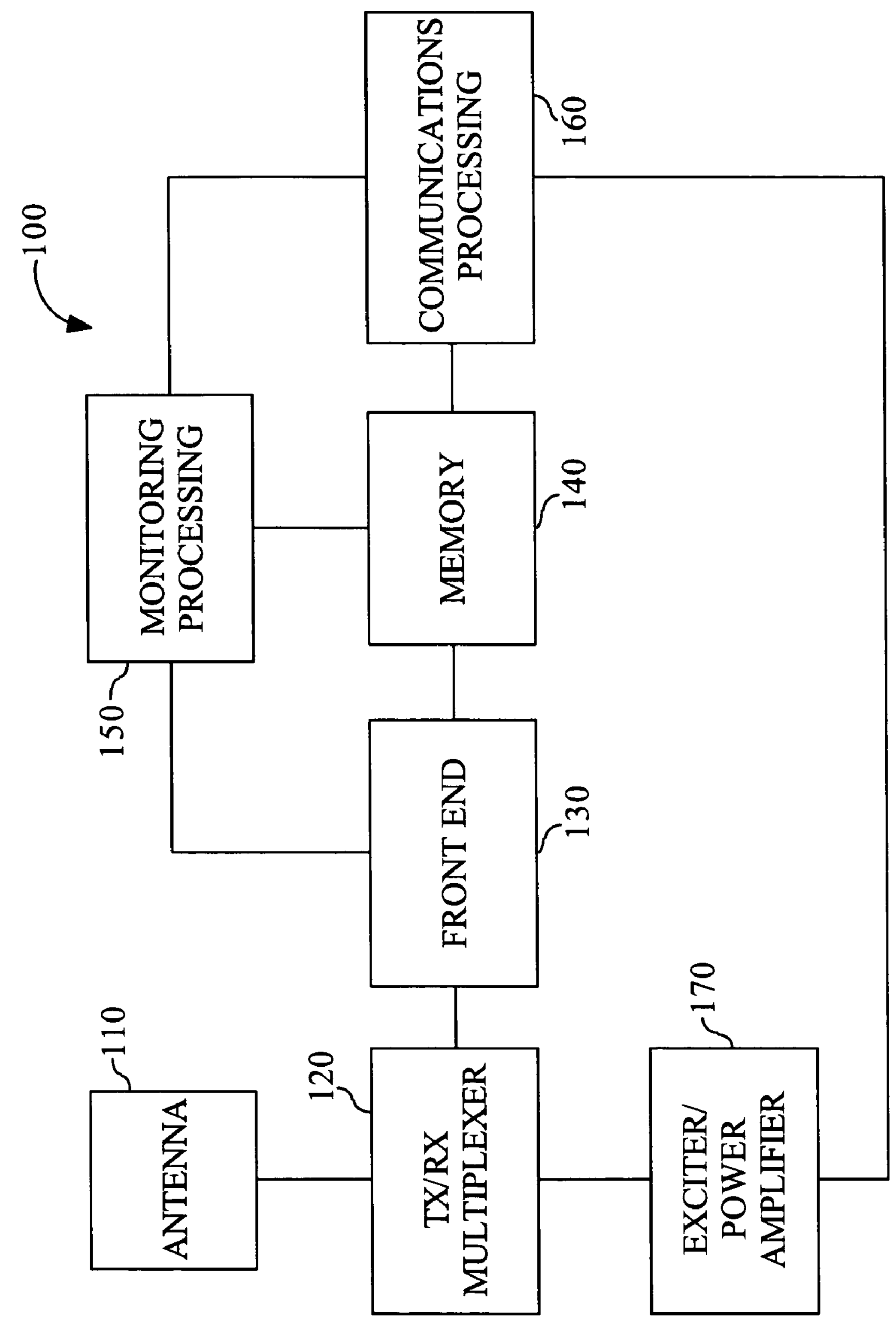
FIG. 1 depicts a block diagram of a staring receiver in accordance with an embodiment of the present invention.

Referring to FIG. 1, a block diagram of a staring receiver 100 in accordance with an embodiment of the present invention is shown. Staring receiver 100 may include an antenna 110, a transmitter/receiver multiplexer 120, a RF front end 130, memory 140, monitoring processing 150, communications processing 160 and an exciter/power amplifier 170. It is contemplated that monitoring processing 150 and communications processing 160 may operate with separate hardware and software according to one embodiment of the invention. In an alternative embodiment of the invention, the functional techniques of both monitoring processing 150 and communications processing 160 may be employed within the same hardware/software implementation and yet capable of simultaneous operation and interoperability with each other. Staring receiver 100 may be capable of staring across an entire hopped bandwidth via the front end 130 and may acquire channel samples. Front end 130 may achieve wide bandwidth coverage either with pairing of a number of limited bandwidth RF paths or one extremely wideband path. RF front end 130 may include a filter function for limiting signals within operating frequency bands, an amplifier function for boosting signal power and a mixer function for shifting frequencies between RF and lower frequencies. Advantageously, staring receiver 100 is not subject to traditional tuning problems encountered by receivers known to the art. Traditional tuning architectures are limited to serial visibility of a single frequency at a time whereby the staring receiver 100 may allow for simultaneous visibility and reception of multiple users with different time and frequency hopping patterns.

Channel samples acquired by front end 130 may be stored in memory 140. Staring receiver 130 captures the channel over a wide bandwidth and a significant period of time. Data from channel samples stored in memory 140 may be analyzed by monitoring processing 150 for signal detection and identification. Monitoring processing 150 may provide broad characterization of the RF channel. Monitoring processing 150 may also operate to provide feedback to front end 130 for gain control, signal cancellation and excision. For example, monitoring processing 150 may adjust the filter range of a filter of the front end, adjust the gain of an amplifier of the front end and the like. Communication processing 160 may also analyze channel samples from memory 140 for demodulation, signal extraction and transmission formation. Communication processing 160 may receive channel characterization information from monitoring processing 150 and may provide baseband transmission message output to the exciter/power amplifier 170.

Employing monitoring processing 150 and communication processing 160 fed with a core channel sample capturing element may lead to significant increases in system capabilities. For example, the ability to tightly couple characterization and communications and exploit the RF environment in a low-latency manner may be achieved. Additionally, communications may be initiated by radiometric detection allowing for repeat jammer initiation of communication links on non-preplanned frequencies. For example, radiometric feedback may be utilized to guide the receive 100 to specific frequencies for signal demodulation if no pre-defined TSEC frequency coordination is desired between terminals. In this manner, the communications systems may rely on a waveform that acts similarly to a follower jammer, by detecting the "companion" incoming emitter and following it by transmitting on the detected signal's frequencies hop by hop. A follower jammer may attempt to jam or effectively hide the detected signal. The receiver architecture may also be employed for spoofing to defeat geographically diverse intercept receivers and simplify the geographically diverse cross correlation approach to detection and geolocation.

Digital techniques providing intercept capability and modulation recognition may be applied to data extracted from memory 140. Monitoring processing 150 may identify energy in specific bands that may be further analyzed utilizing modulation recognition techniques. Finger printing and parametric identification techniques may determine a type of modulation in addition to estimates of chip rates and other modulation parameters. Modulation recognition techniques may analyze the received data to extract features. These features may include spectral characteristics, amplitude, phase and frequency information. Signal processing techniques employed by communication processing 160 such as short time Fourier processing and wavelet analysis in conjunction with nonlinear processing may extract the desired features. The extracted features may automate neural networks that provide a classification of the intercepted transmission.

Figure 2:
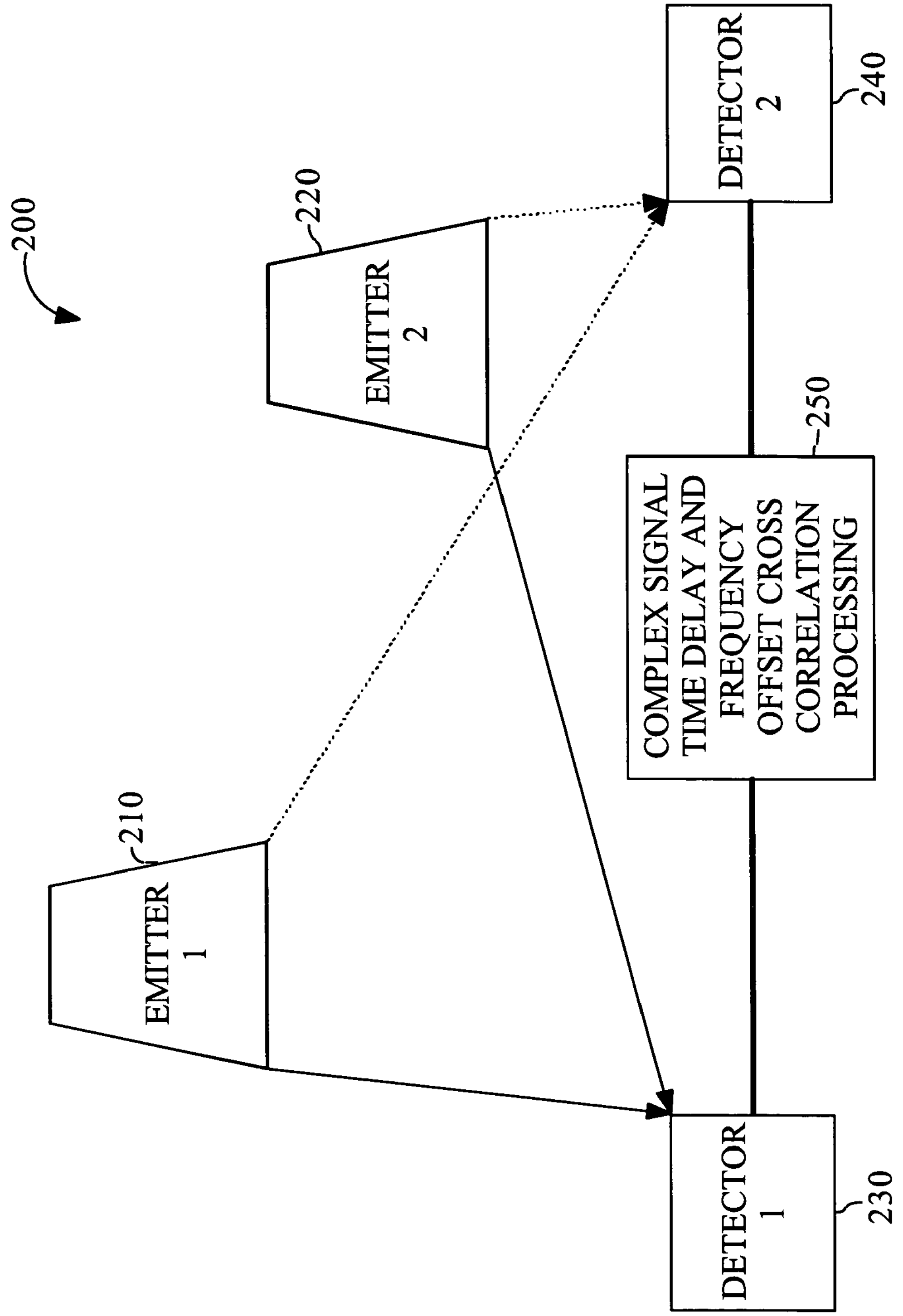
FIG. 2 depicts a block diagram of a system for cross correlation computation of diverse intercept receivers.

In one embodiment of the invention, staring receiver 100 may be employed to clutter the complex ambiguity function (CAF) space of a geographically diverse intercept receiver. This may be advantageous as a way to prevent the interception of wireless signals by diverse intercept receivers. Referring to FIG. 2, an embodiment of a system 200 for cross correlation computation of diverse intercept receivers is shown. Emitters 210, 220 may transmit wireless communication signals in which detectors 230, 240 attempt to acquire. Detectors 230, 240 may be separated by a significant distance whereby the background noise environment between each detector is close to uncorrelated. Each detector 230, 240 may capture complex samples of the signals across a high bandwidth cross link whereby a frequency offset cross correlation processing 250 is performed. The frequency offset cross correlation function may produce a resolution of Time Difference Of Arrival (TDOA) and Frequency Difference of Arrival (FDOA). Each emitter 210, 220 has a (TDOA, FDOA) point at which it exists in the CAF space. With these two quantities, a signal bearing and an apparent velocity may be resolved for interception of a signal. CAF processing takes advantage of the propagation of the signal. With two sets of diversity nodes including three antennas, full position of the emitter may also be resolved.

Figure 3:
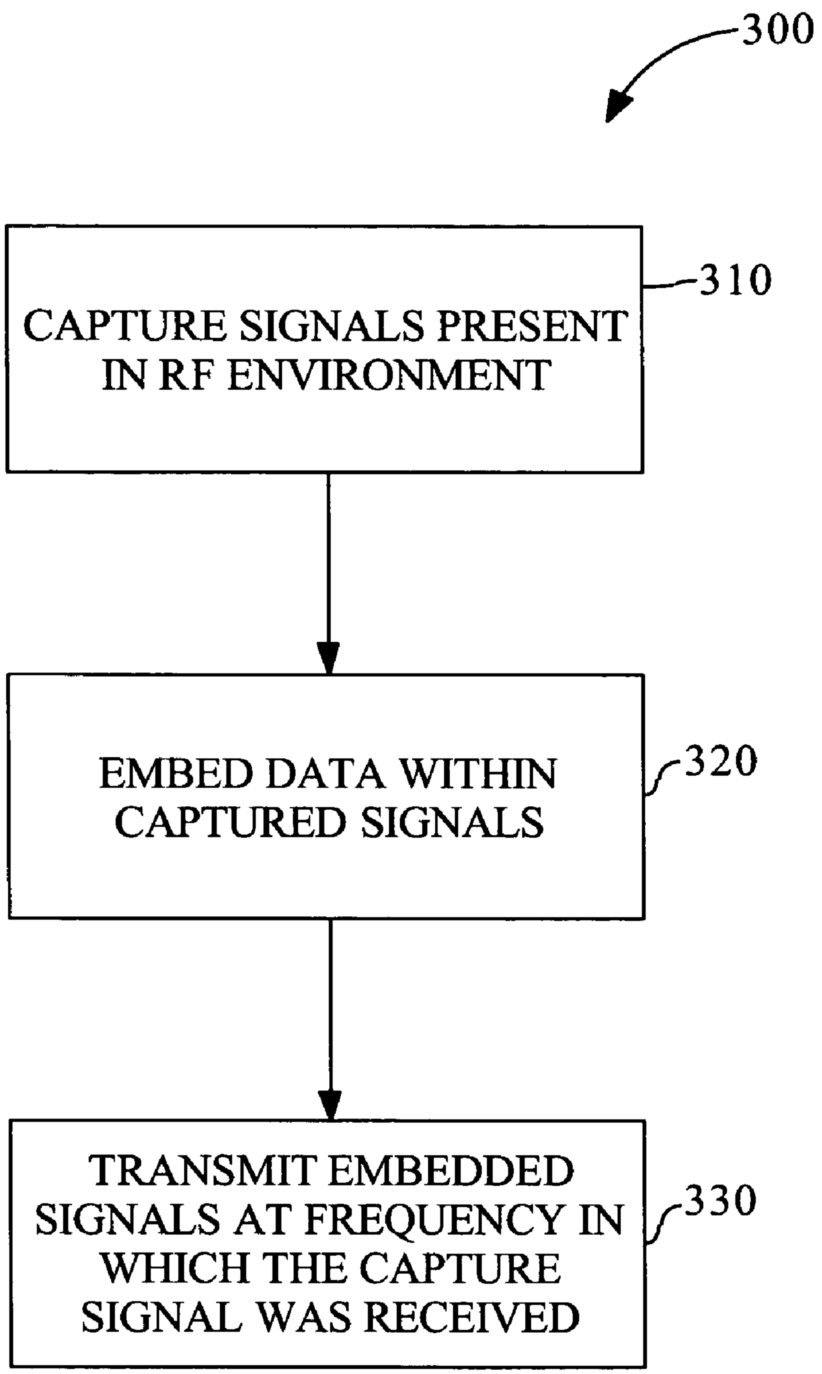
FIG. 3 depicts a process for creating false cross correlation returns in the CAF space in accordance with an embodiment of the present invention.

Referring to FIG. 3, a process 300 for creating false cross correlation returns in the CAF space is shown. In an embodiment of the invention, staring receiver 100 of FIG. 1 may execute process 300 for creating false cross correlation returns in CAF space. In an advantageous aspect of the present invention, the creation of false cross correlation returns in the CAF space may thwart the ability of geographically diverse intercept receivers from determining a location of an emitter of a signal. Process 300 may begin upon the capture of signals present within the RF environment 310. Front end 130 of receiver 100 of FIG. 1 may operate to acquire signals in a wide bandwidth of radio frequency signals.

The next step may be embedding data within captured signals 320 to mask TDOA and FDOA signatures. In an embodiment of the invention, data may be embedded in captured signals by inserting additional modulated data. The embedded data may be of the same modulation type as the original transmission. Alternatively, the embedded data may employ alternate approaches with a low detectability probability such as direct sequence spread spectrum. The embedded modulation may be at a same power level as the captured signal, or potentially at a lower power level, thus allowing characteristics of the captured signal to dominate in the spectral domain and correlation domain. Signal embedding may be performed in a similar manner as the generation of traditional communications in the radio modem and exciter structure. It is contemplated that the captured signal and embedded data may be merged in many ways and various implementations, for example, the captured signal may be remodulated in the modem tightly coupled with the embedded data or separately and merged before the exciter and mixing stages. Embedded data may include tagging information and position information. Tagging information may include accurate time stamping, frequency, position, and any number of other elements relevant to captured signal observation.

The embedded signals may be transmitted at a frequency in which the capture signal was received 330. The RF captured samples when transmitted at the frequency at which they were received will have 100% correlation to the original incoming transmission when arriving at a CAF receiver. Advantageously, false (TDOA, FDOA) correlation peaks may be created from the embedded data within the re-transmitted signals. The false correlation peaks may be indistinguishable from the original signal whereby the true correlation returns may be impossible to separate from the false correlation returns. By removing the ability to obtain the true correlation returns, interception of the signal may be prevented.

The embedded signal of process 300 of FIG. 3 may be modulated in a variety of ways, and the embedded signal may be transmitted at different power levels. The embedded signal may be optimized through exploitation of a variety of methods. In an embodiment of the invention, the method of exploitation balancing approach would be taken in the same manner that detectability is balanced in low probability of exploitation/low probability of detection (LPE/LPD) communications systems.

Figure 4:
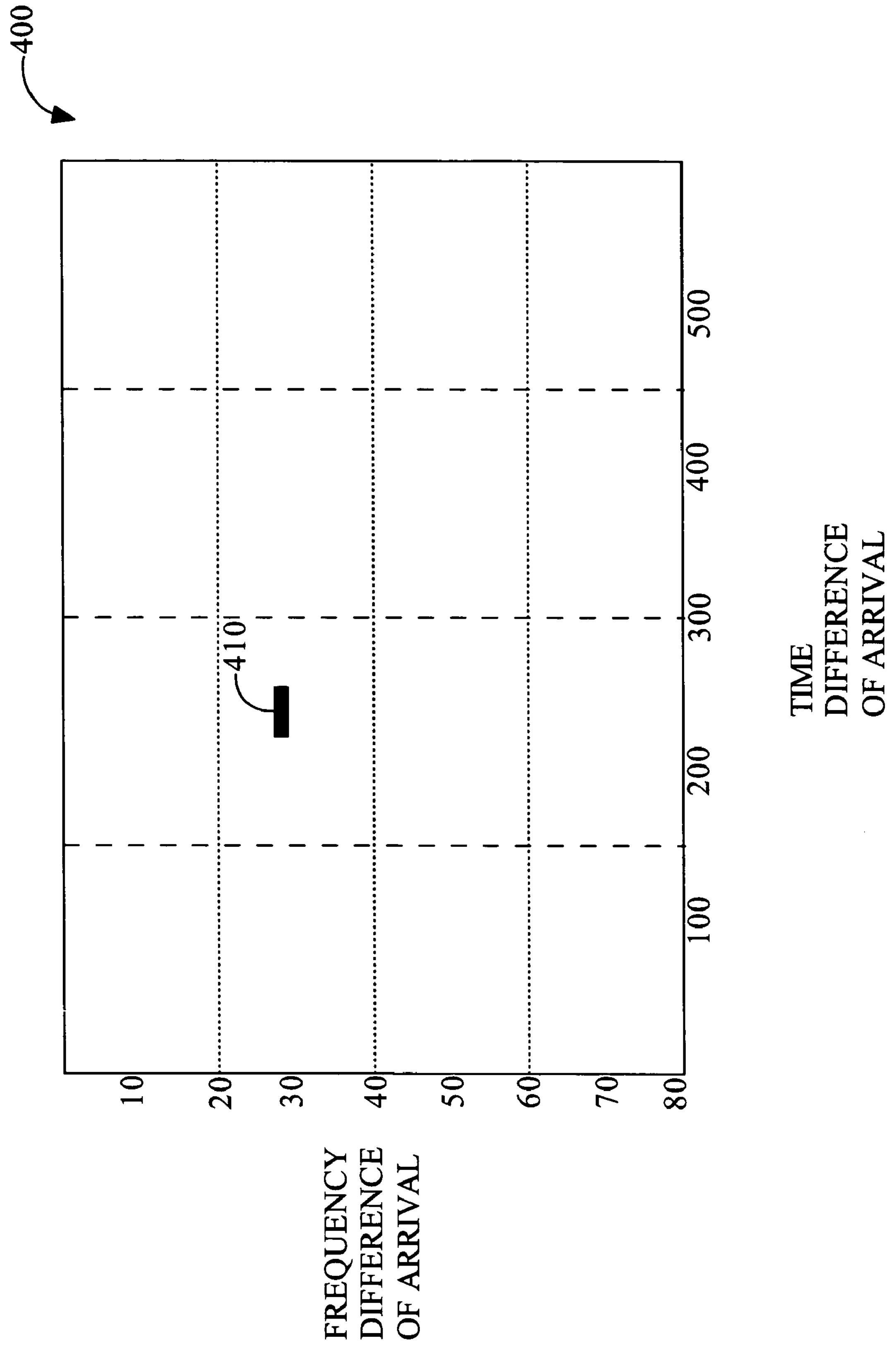
FIG. 4 depicts a CAF response of a channel with one emitter in accordance with an embodiment of the present invention.
Figure 5:
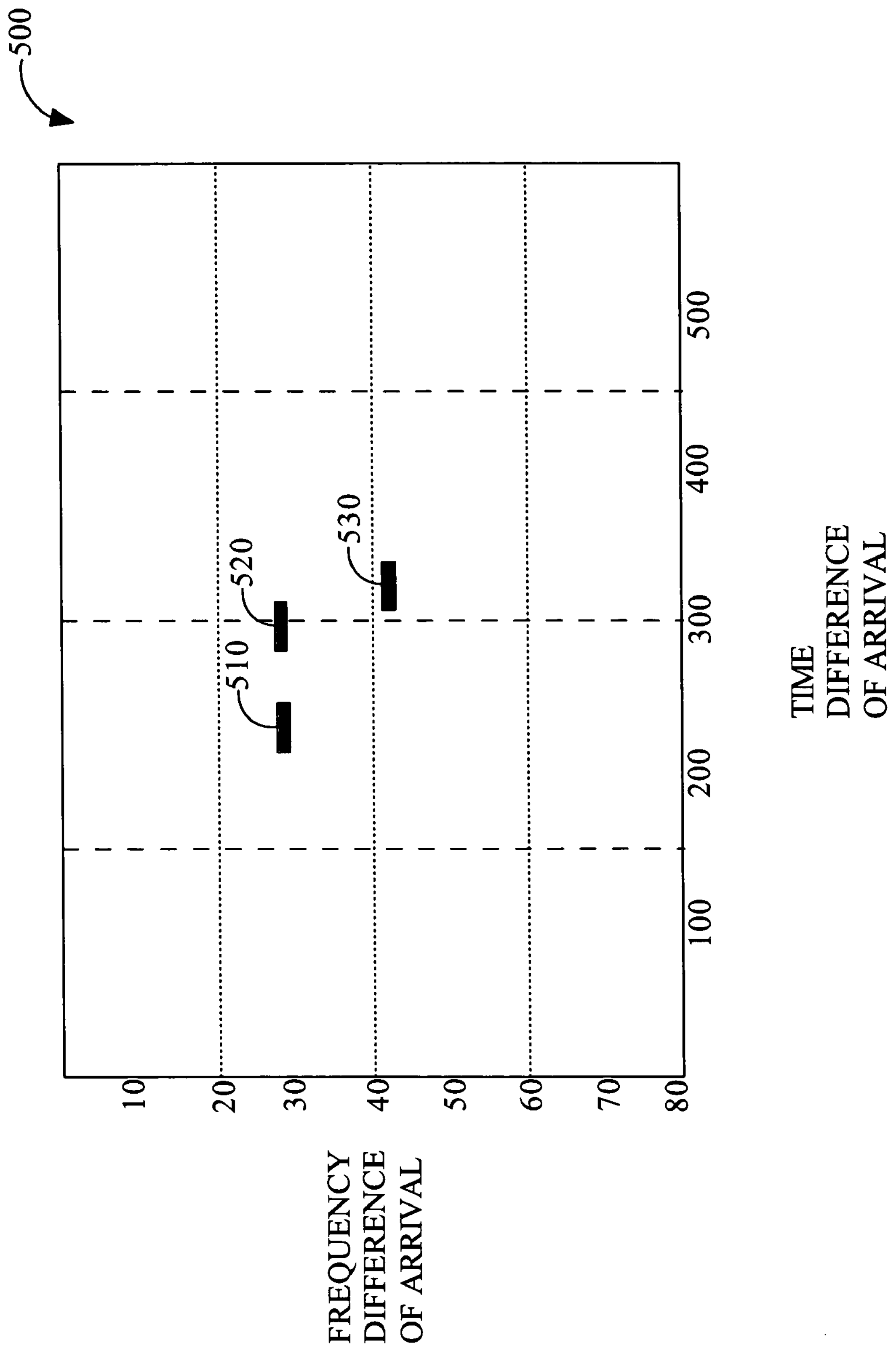
FIG. 5 depicts a CAF response 500 when the original "mark" signal is captured and retransmitted with embedded data in accordance with an embodiment of the present invention.

Referring to FIG. 4, a CAF response 400 of a channel with one emitter is shown. For purposes of illustration, the signal present in the background may be referred as a "mark" signal 410. Referring to FIG. 5, a CAF response 500 when the original "mark" signal 510 is captured and retransmitted with embedded data is shown. Two additional false cross correlations 520, 530 may be included which may be indistinguishable from the original "mark" signal 510 CAF return. Additionally if the proper section of the incoming "mark" signal is extracted, the retransmission may not register in the acquisition hardware of an enemy's communications receivers. With added near far complexity, the dimensionality of the problem increases even further.

Advantageously, staring receiver 100 of FIG. 1 may further exploit the effect of creating false cross correlation returns in CAF space. Proper coordinated TDOA and FDOA nodal sharing and cooperative computation may allow a system wide construction of a complete RF geographic picture. In an embodiment of the invention, a repeating communications approach may be applied whereby due to the simultaneous monitoring processing and communications processing capability, communications nodes may wait for incoming "mark" signals to initiate communications. Many receivers may acquire signals, embed data and re-transmit the signals with embedded data regarding pseudorandom delay times. Delay times may provide a stochastic collision nature that may be tolerated by strong coding techniques. Multiple users may be cross correlating not only with the original user, but with each other. The user-to-user cross correlation behavior can additionally be exploited even in the absence of a "mark" signal with proper channel access structuring.

Staring receiver 100 may be capable of triangulation whereby the repeating communications approach may be applied to provided detection and geolocation information on the captured signal. For example, communications may be initiated by radiometric detection allowing for repeat jammer initiation of communication links on non-preplanned frequencies. For example, radiometric feedback may be utilized to guide the receiver 100 to specific frequencies for signal demodulation if no pre-defined TSEC frequency coordination is desired between terminals. In this manner, the communications systems may rely on a waveform that acts similar to a follower jammer, by detecting the "companion" incoming emitter and following it by transmitting on the detected signal's frequencies hop by hop. Embedded information may include tight time tagging and position information from the receiver that acquired the original signal and re-transmitted the signal. When the re-transmitted signal is acquired by another receiver, the embedded information may be extracted. The embedded data signal received by the second receiver may be cross correlated with the memory of the second receiver to calculate the difference in time that correlated and the embedded information. Through the cross correlation, a location of the original emitter may be determined.

Employing this approach for triangulation may include a plurality of receivers. An initial receiver may be able to detect a signal. The initial receiver may mark when it was detected and retransmit the signal with position and precise timing information embedded within the transmitted signal. Other receivers may receive the retransmitted captured signal, correlate on the embedded data and extract position and precise timing information from the embedded data from the initial receiver. The other receivers may take the captured signal portion of the transmission and correlate it against its own data concerning the captured signal. The initial receiver's time stamp may be compared against the other receiver's time stamp and the arrival bearing may be determined. If multiple receivers participate, the captured signals emission position may be resolved.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

The invention claimed is:

1. A method, comprising:

capturing signals present in a radio frequency environment;

embedding data within captured signals to create a follower jammer signal for each captured signal, said data including time stamp information and position information;

transmitting the follower jammer signal with the embedded data at a frequency in which each captured signal of the capture signals was acquired; and re-transmitting said follower jammer signal at said frequency in which each captured signal of the capture signals was acquired, said follower jammer signal being re-transmitted after a delay of time after said follower jammer signal is first transmitted, the follower jammer signal creating false correlation peaks based upon a time distance of arrival information and a frequency distance of arrival information of said captured signals in a complex ambiguity function space from the embedded data within the follower jammer signal to prevent detection of said captured signal.

2. The method as claimed in claim 1, wherein said false correlation peaks are indistinguishable from a cross correlation peak of a captured signal.

3. The method as claimed in claim 1, wherein said captured signal includes data.

4. The method as claimed in claim 3, further comprising extracting said data from said captured signal.

5. The method as claimed in claim 4, further comprising comparing a time stamp of the extracted data with another time stamp to determine an arrival bearing of the captured signal.

6. The method as claimed in claim 1, wherein said embedding data within captured signals includes inserting additional modulated data of a similar type as the captured signal.

7. The method as claimed in claim 6, wherein said additional modulated data is at a similar power level as the captured signal.

8. A system, comprising:

means for capturing signals present in a radio frequency environment;

means for embedding data within captured signals to create a follower jammer signal for each captured signal, said data including time stamp information and position information;

means for transmitting the follower jammer signal with the embedded data at a frequency in which each captured signal of the capture signals was acquired; and means for re-transmitting said follower jammer signal with the embedded data at said frequency in which each captured signal of the capture signals was acquired, said follower jammer signal being re-transmitted after a delay of time after said follower jammer signal is first transmitted, the follower jammer signal creating false correlation peaks based upon a time distance of arrival information and a frequency distance of arrival information of said captured signals in a complex ambiguity function space from the embedded data within the follower jammer signal to prevent detection of said captured signal.

9. The system as claimed in claim 8, wherein said false correlation peaks are indistinguishable from a cross correlation peak of a captured signal.

10. The system as claimed in claim 8, wherein said captured signal includes data.

11. The system as claimed in claim 10, further comprising means for extracting said data from said captured signal.

12. The system as claimed in claim 10, further comprising means for comparing a time stamp of the extracted data with another time stamp to determine an arrival bearing of the captured signal.

13. The system as claimed in claim 8, wherein said means for embedding data within captured signals includes means for inserting additional modulated data of a similar type as the captured signal.

14. The system as claimed in claim 13, wherein said additional modulated data is at a similar power level as the captured signal.

* * * * *